Patented June 1, 1948

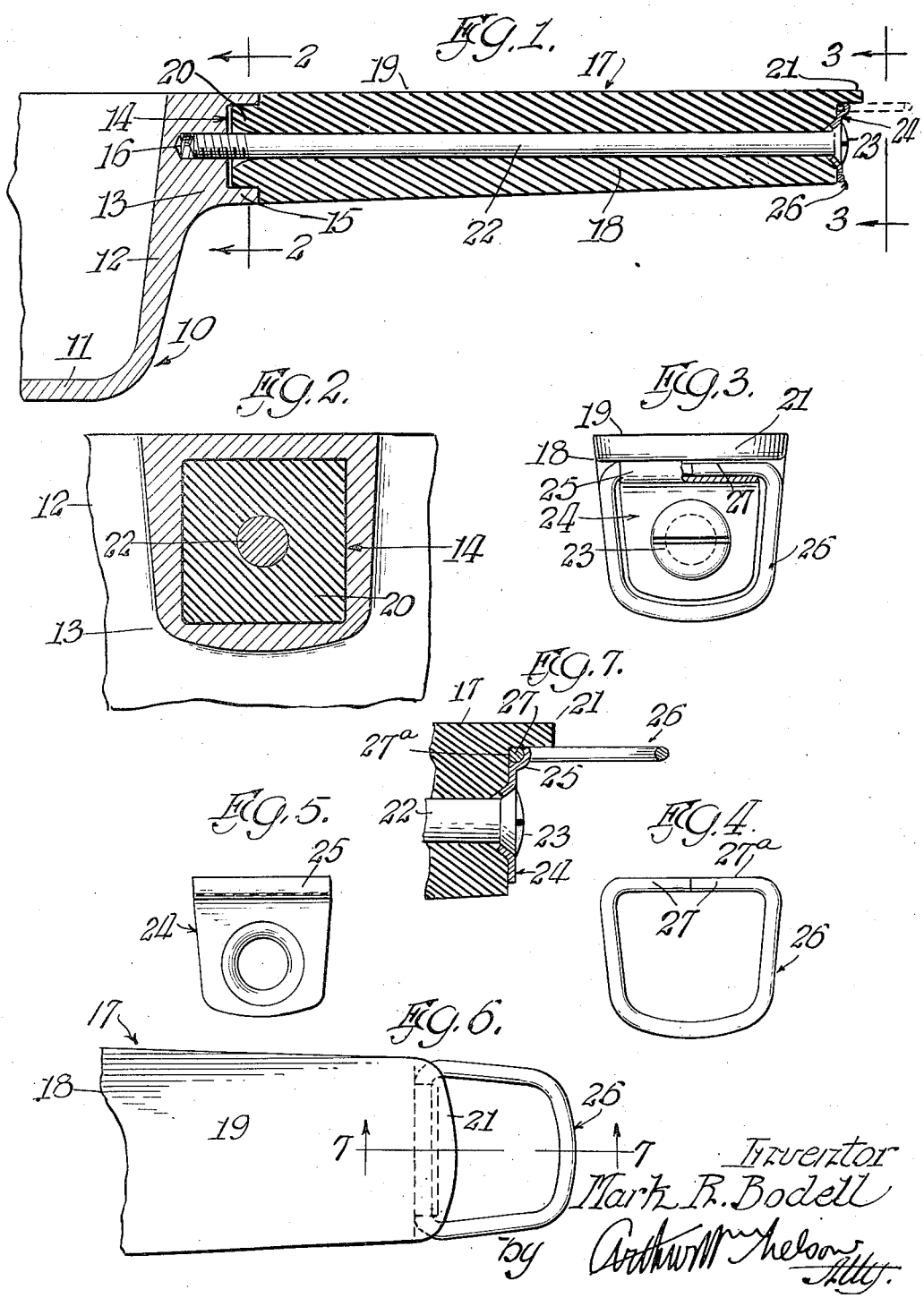

2,442,454

UNITED STATES PATENT OFFICE 2,442,454

HANDLE STRUCTURE FOR COOKING UTENSILS

Mark R. Bodell, Glen Ellyn, Ill., assignor to Club Aluminum Products Company, Chicago, Ill., a corporation of Illinois Application February 21, 1947, Serial No. 730,108

3 Claims. (Cl. 16—110)

This invention relates to improvements in handle structures for cooking utensils and it consists of the matters hereinafter described and more particularly pointed out in the appended claims. The invention is more especially concerned with a structure wherein the handle projects laterally from and is rigidly fixed to a side wall portion of the utensil, such as a frying pan, as distinguished from the swinging or pivotally connected bail type of handle employed on other types of cooking utensils.

One of the objects of the present invention is to provide simple, inexpensive, efficient means for not only attaching a handle rigidly to the body of the utensil, but also whereby a loop-like element may be so applied to the outer end of the handle, that said element may be swung from a concealed out-of-the-way position on said end of the handle, to an open or extended position to afford a hanging support for the utensil from a wall or similar hook.

Another object of the invention is to provide in a structure of this kind an arrangement of parts wherein the loop-like element is so correlated and arranged with respect to the associated outer end of the handle, that when it is in its closed or concealed position it will not be engaged by a part of the hand when grasping the handle in the conventional manner.

Also, it is an object of the invention to provide in a structure of this kind, means projecting from the outer end of the handle and against which the loop-like element engages as a stop when in its open extended position exposing enough of said element for engaging the same with a wall hook or the like for a hanging support of the utensil.

The above mentioned objects of the invention, as well as others, along with the advantages thereof, will more fully appear as the specification proceeds.

In the drawing:

Fig. 1 is a longitudinal vertical sectional view through a handle structure for cooking utensils embodying the preferred form of the invention.

Fig. 2 is a transverse vertical detail sectional view, as taken on the line 2—2 and on a scale enlarged over that of Fig. 1.

Fig. 3 is a view in elevation of the outer end of the handle structure, as viewed in the direction of the arrows 3—3 and on the scale of Fig. 2.

Fig. 4 is a view in elevation of a hanger loop element embodied in the structure, on the scale of Fig. 3.

Fig. 5 is a view in elevation of a hanger loop retaining clip embodied in the structure, on the scale of Fig. 3.

Fig. 6 is a top plan view of the outer end of the handle structure with the hanger loop in its extended position, also on the scale of Fig. 3.

Fig. 7 is a longitudinal vertical sectional view through parts of the handle as taken on the line 7—7 and on the scale of Fig. 6.

Referring now in detail to that embodiment of the invention illustrated in the drawing, there is shown in Fig. 1 a fragment 10 of the body of a cooking utensil, such as a frying pan. It includes a bottom 11 and substantially upright side wall 12. An upper part of said side wall is formed to provide a boss 13 of substantially rectangular cross section, in the open end of which is a rectangular recess 14, the sides and top and bottom of which are defined by a flange 15. Centrally in the end of said recess is a threaded recess 16, which best appears in Fig. 1.

Projecting outwardly from said boss 13 is a handle indicated as a whole as at 17 in Fig. 1. This handle includes a generally elongated handle body 18 preferably made of a plastic material and of a substantially rectangular cross section. Said body has a flat top surface 19, inwardly tapering sides and a rounded bottom which are apparent from Fig. 3, said flat top surface being flush with the top edge of the wall 12. The inner end of the handle body cross sectionally matches the flange 15 and said end has a boss 20 fitting within the recess 14 and surrounded by the flange 15.

The outer flat end surface of the handle body is substantially perpendicular to the top surface 19 thereof and projecting longitudinally outward from the junction of said surfaces is a lip or flange 21, that has a length shorter than the depth of said end surface of the handle body. Extending longitudinally through the handle body is a passageway for a retaining bolt 22, the inner end of which projects beyond the boss 20 to have a threaded engagement in the recess 16. The outer end of said bolt has a head 23 that holds a retainer clip 24 in position against the said end surface of the handle body. This clip is provided along its top margin with a hollow bead or flange 25, which abuts against the under side of the lip or flange 21.

Associated with the parts just described is a hanger loop, indicated as a whole at 26 and best appearing in Fig. 4. This loop is made of wire bent to the outline shape and size of the outer end surface of the handle body below the lip 21 and it includes a pintle portion 27 that is adapted to fit within the hollow bead or flange 25 of the clip 24, as best appears in Fig. 3. This pintle portion has a flat side 27a, the purpose of which will soon appear.

When the bolt 22 is drawn up tight in the recess 16, it rigidly fastens the handle body 18 to the utensil body 10 and the head of the bolt fastens the clip 24 to the end of the handle body. Said clip, in turn, operatively attaches the loop 26 in place, in such a manner that it may be swung from the closed out-of-the-way position, shown in Fig. 3, to the extended or open position, shown in Fig. 6, when it is desired to hangingly support the utensil from a wall hook or the like.

When the bolt 22 is drawn up tight, the clip 24 is drawn snugly against the outer end surface of the handle body so as to prevent a free turning of the loop about its pintle portion 27 in the bead. Therefore, said loop is held in its out-of-the-way or closed position, fully within the outline of said surface so that when grasping the handle in the normal manner, the hand will not engage the loop and move it to its open or extended position. To move the loop to its open position, it may be engaged by the finger and swung into such position that a part of the loop will engage the under side of the lip or flange 21 while the greater and closed end part of the loop will project beyond the lip and be exposed, as best appears in Fig. 6. Thus, the exposed part may be caused to engage upon a hook or the like on a wall for the hanging support of the utensil. In this position, the flat side 27a of the pintle 27 will engage the flat end surface of the handle body 18 and will be held thereagainst by the springy action of the clip 24, with sufficient pressure so that the hanger loop will remain in its extended position and will not swing back, under its own weight, to its closed position against the end of the handle body. Obviously the loop may be swung to closed position when the utensil is to be used.

The structure is simple and inexpensive to make, but is efficient in use for its intended purpose.

While in describing the invention I have referred in detail to the form and arrangement of the parts thereof, the same is to be considered only in the illustrative sense and therefore I do not wish to be limited thereto except as may be specifically set forth in the appended claims. I claim as my invention:

1. A cooking utensil handle embodying therein an outer end surface disposed generally transversely of the handle, a projecting portion overhanging said outer end surface, a hanger loop having a pintle portion disposed adjacent the said end surface and under said projecting portion, and means secured to the end of the handle, and embracing the pintle portion of the hanger loop, said hanger loop being swingable to a closed position transversely on the handle, wherein it is guarded by said overhanging portion, and to an open position wherein it extends beyond said overhanging portion, at least in part.

2. A cooking utensil handle embodying therein an outer end surface disposed generally transversely of the handle, a projecting portion overhanging said outer end surface, a hanger loop having a pintle portion disposed adjacent the said end surface and under said projecting portion, a retainer clip on the end of the handle and embracing the pintle portion of the loop hanger, a bolt extending through said handle and having a head portion engaging the outer side of the retainer clip and pressing it against the pintle portion of the hanger loop, said hanger loop being swingable to a closed position transversely on the handle, wherein it is guarded by said overhanging portion, and to an open position wherein it extends beyond said overhanging portion, at least in part.

3. A cooking utensil handle having an outer end surface disposed generally transversely of the handle, a projecting portion overhanging said end surface, a hanger loop having a pintle portion disposed adjacent said end surface and under said projecting portion, said pintle portion having a flattened side, and means secured to the end of the handle and embracing the pintle portion of the hanger loop, said hanger loop being swingable from a closed position parallel with and adjacent said end surface wherein it is guarded by said projecting portion to an open position wherein the flattened side of said pintle portion is yieldingly pressed against said end surface to releasably hold said loop in said open position with another portion thereof extending beyond said projecting portion.

MARK R. BODELL.

REFERENCES CITED

The following references are of record in the file of this patent:

UNITED STATES PATENTS

| Number | Name | Date |
|---|---|---|
| 760,890 | Mackinder | May 24, 1904 |
| 1,970,151 | Smith | Aug. 14, 1934 |
| 2,372,954 | Jester | Apr. 3, 1945 |
| 2,381,510 | Muldoon | Aug. 7, 1945 |

FOREIGN PATENTS

| Number | Country | Date |
|---|---|---|
| 20,902 | Great Britain | Sept. 20, 1906 |